(12) United States Patent
Cappuccitti

(10) Patent No.: US 12,481,178 B2
(45) Date of Patent: Nov. 25, 2025

(54) EYEWEAR MEASURING AND ADJUSTMENT MOLD

(71) Applicant: Renato Cappuccitti, Ponce Inlet, FL (US)

(72) Inventor: Renato Cappuccitti, Ponce Inlet, FL (US)

( * ) Notice: Subject to any disclaimer, the term of this patent is extended or adjusted under 35 U.S.C. 154(b) by 565 days.

(21) Appl. No.: 18/147,580

(22) Filed: Dec. 28, 2022

(65) Prior Publication Data

US 2023/0333414 A1 Oct. 19, 2023

Related U.S. Application Data

(63) Continuation-in-part of application No. 29/837,493, filed on May 5, 2022, now Pat. No. Des. 1,042,582.

(60) Provisional application No. 63/330,596, filed on Apr. 13, 2022.

(51) Int. Cl.
*G02C 13/00* (2006.01)

(52) U.S. Cl.
CPC .................................. *G02C 13/005* (2013.01)

(58) Field of Classification Search
CPC .............. G02C 13/003; G02C 13/005; A61B 3/111–112; A61B 3/11; B24B 13/0055
USPC ................ D10/65, 100; D16/100, 130, 136; D24/150; 351/204, 178, 200, 159.75, 351/208, 228, 141, 159.42, 159.41, 231, 351/214
See application file for complete search history.

(56) References Cited

U.S. PATENT DOCUMENTS

| | | | |
|---|---|---|---|
| 3,987,554 A * | 10/1976 | Pastore | G01B 3/02 351/204 |
| 4,252,419 A | 2/1981 | Padula, II et al. | |
| 4,531,297 A * | 7/1985 | Stoerr | G02C 13/005 351/204 |
| 4,575,946 A * | 3/1986 | Bommarito | G02C 13/005 33/200 |
| 7,996,997 B2 * | 8/2011 | Warntjes | G02C 13/005 351/204 |
| 11,640,073 B2 * | 5/2023 | Ikuta | G02C 5/20 351/41 |
| 2007/0193043 A1 * | 8/2007 | Katzman | G02C 13/003 33/200 |
| 2008/0143962 A1 * | 6/2008 | Meyers | G02C 7/021 33/507 |
| 2010/0195046 A1 | 8/2010 | Blum et al. | |
| 2023/0333414 A1 * | 10/2023 | Cappuccitti | A61B 3/11 |

FOREIGN PATENT DOCUMENTS

WO 1998015222 A1 4/1998

\* cited by examiner

*Primary Examiner* — Kristina M Deherrera
*Assistant Examiner* — Gilbert Bernard Shuster

(57) ABSTRACT

Disclosed herein is a specialty device and tool for eye care professionals. The device of the present invention includes a top section having a plurality of temple adjusters, a viewing, a middle section that is tapered to a thinner thickness than the top section, wherein the middle section includes: a plurality of large middle marks, a plurality of small middle hashmarks, a plurality of measuring slots placed in the middle section, a bottom section that includes: a plurality of bottom temple adjusters, a plurality of large bottom marks, a plurality of small bottom hashmarks, and a plurality of bottom measuring slots.

20 Claims, 8 Drawing Sheets

EYEWEAR MEASURING AND ADJUSTMENT MOLD

FIELD OF THE INVENTION

The present invention relates generally to measuring devices and eyeglass adjustment molds. More specifically, the present invention is a multi-use measuring device for a subject's eyes that uses see-through slits to ensure the device is aligned with the subject's gaze. In addition, the present invention functions as a mold for bending eyeglass frames at the arm and ear loop.

BACKGROUND OF THE INVENTION

Progressive eyeglass lenses are a type of lens that function similarly to bifocals. The lenses are "multifocal," which means different optical power is provided based on which portion of the lens is looked through. Instead of having a line between distinct portions with different optical power like traditional bifocals, progressive lenses provide a gradient between optical powers, with a smoother transition to avoid blind spots. Progressive lenses may even be trifocal, with varying powers across the top, center, and bottom of the frames. It is especially important with these lenses to have a proper fit on the wearer's eye. Designing lenses and fitting the lenses into frames requires measurement to different points of the eye so that the wearer has the correct optical power in the various portions of their field of view.

Eye to eye parallelism is crucial when fitting individuals with eyewear for perfect results. An objective of the eyewear measuring, and adjustment mold is to provide users with a device to measure pupil height, multifocal lens segment height, and adjust temples properly and accurately on eyewear. The present invention intends to provide users with a device that can provide the eye care professional with a multiple use tool. In order to accomplish that, a preferred embodiment of the present invention comprises a top section, a middle section, and a bottom section. Thus, the present invention is specialty device that provides precise pupil height, and lined multifocal lens segment height measurement, curved and slotted guides for temple adjustments to allow eye care professionals to efficiently and accurately size and alter eyewear for patients.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a specialty device and tool for eye care professionals. The device of the present invention includes a top section having a plurality of temple adjusters, a viewing, a middle section that is tapered to a thinner thickness than the top section, wherein the middle section includes: a plurality of large middle marks, a plurality of small middle hashmarks, a plurality of measuring slots placed in the middle section, a bottom section that includes: a plurality of bottom temple adjusters, a plurality of large bottom marks, a plurality of small bottom hashmarks, and a plurality of bottom measuring slots.

In one embodiment, the plurality of large middle marks include a horizontal shape with an accompanying number going from 10 to 35 increasing by 5 at each interval, each of the plurality of large middle marks is separated by 5 mm.

In one embodiment, the plurality of large bottom marks includes rectangular recesses into the bottom section with accompanying numbers from 10 to 25 in increments of 5, each of the plurality of large bottom marks is separated by 5 mm.

In some embodiments, the plurality of small bottom hashmarks includes a rectangular shaped recess with each one being positioned 1 mm from each other and In some embodiments, the plurality of bottom measuring slots includes rectangular empty sections that traverse through a body of the bottom section.

DETAIL DESCRIPTIONS OF THE INVENTION

All illustrations of the drawings are for the purpose of describing selected versions of the present invention and are not intended to limit the scope of the present invention.

Figure 1:
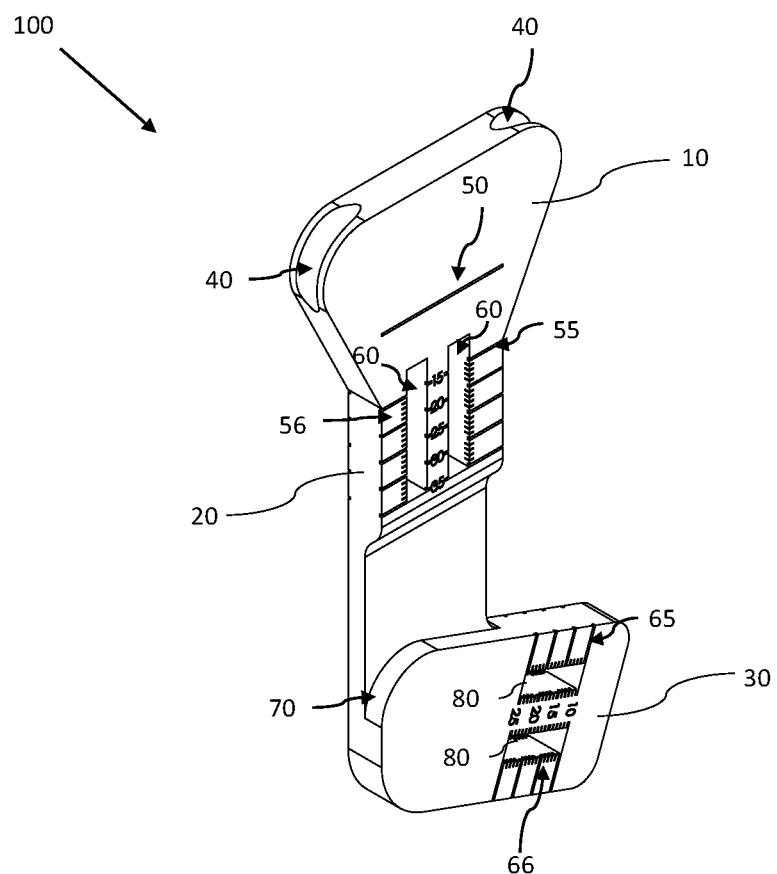
FIG. 1 is a perspective view of the present invention.

As shown in FIG. 1, the present invention is a specialty device and tool for eye care professionals. An objective of the present invention is to provide users with a device that can be used to measure and adjust eyewear for individuals. To accomplish this the device 100 of the present invention comprises a top section 10, a middle section 20, and a bottom section 30.

Many of these components allow for the eye care provider to easily measure the pupils of the patient. Each of the components are connected, with the top section 10 being positioned at the top side of the middle section 20 and the bottom section 30 being positioned at the bottom side of the middle section 20. The components of the middle section 20 are used to measure and record important heights and widths about the patient. Thus, the present invention is specialty device 100 that provides precise pupil height, and lined multifocal lens segment height measurement, curved and slotted guides for temple adjustments to allow eye care professionals to efficiently and accurately size and alter eyewear for patients.

Figure 3:
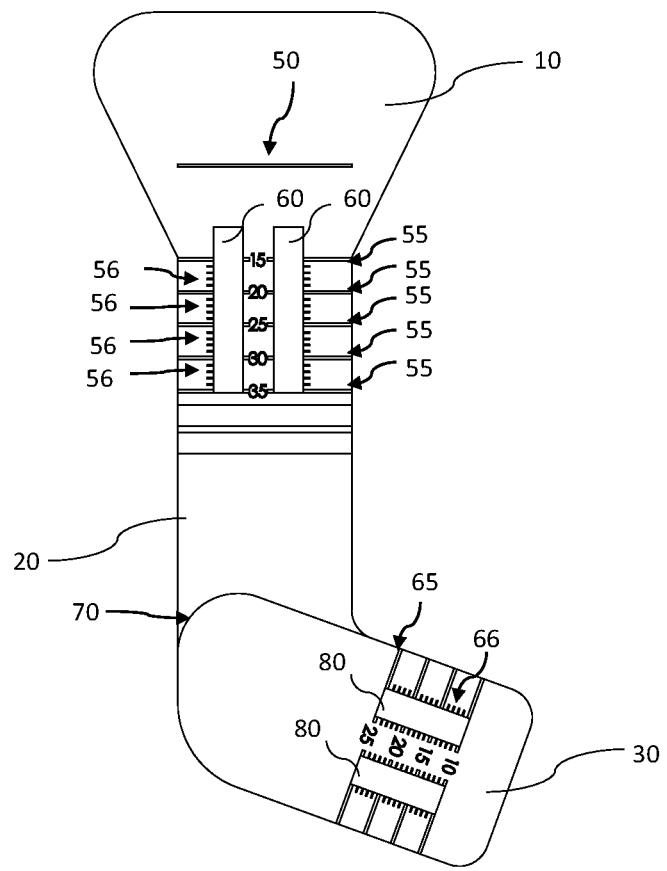
FIG. 3 is a front view of the present invention.

The present top section 10 is made of a sturdy plastic, metal or any suitable material with a trapezoidal shape with curved points as seen in FIG. 3. The top section is located at the top of the present invention and is designed to adjust temple sections of eyewear.

In its preferred embodiment, the top section 10 comprises a plurality of temple adjusters 40 and a viewing slot 50.

Figure 7:
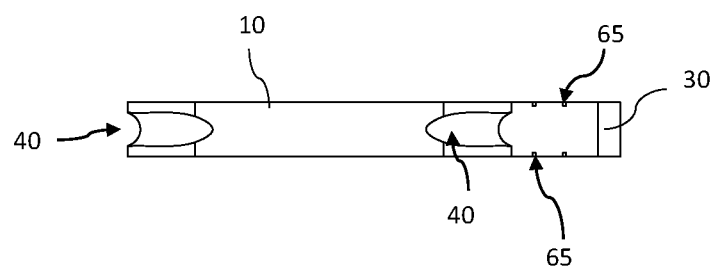
FIG. 7 is a top view of the present invention.

The plurality of temple adjusters 40 is located along the top left and right side as shown in FIG. 7. The first plurality of temple adjusters 40 is a circular shaped curved divot that runs along the edge of the top section 10. This is designed to allow the user to utilize the curve to bend the temple portion of eyewear to adjust as needed to match the patient demands.

The plurality of temple adjusters 40 mimics the curve of the mastoid bone and ear of the patient, resulting in a curved temple section of the adjusted eyewear that will be more comfortable for the average patient.

Positioned below the plurality of temple adjusters 40 is the viewing slot 50. The viewing slot 50 can be positioned in the body of the top section 10.

In some embodiments, the viewing slot 50 can be a rectangular shaped horizontal slit. The viewing slot 50 traverses through the entire body of the top section 10 and is designed so the patient can look through the slot when positioned directly over the pupil, thus allowing the eye care provider to easily observe the position of the eyeglass in relation to the pupil and to properly record measurements important for the lens positioning.

The viewing slot 50 is designed with a very narrow width to ensure the line of sight is properly aligned so that the eye care provider obtains accurate measurements. It should be further noted that, the top section 10 can be created in many various shapes and sizes and the viewing slot 50 could be designed in various ways while still staying within the scope of the present invention.

Figure 4:
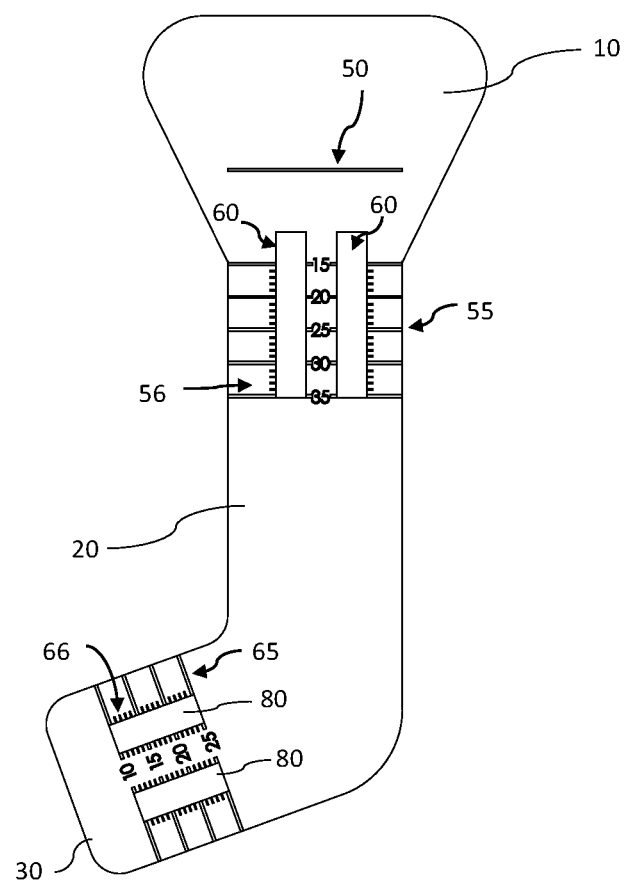
FIG. 4 is a rear view of the present invention.

The middle section 20 is positioned below the top section 10 along the smaller side of the trapezoidal shape of the top section 10. The middle section 20 is a rectangular shape that extends downwards away from the top section 10 as seen in FIG. 4.

Figure 6:
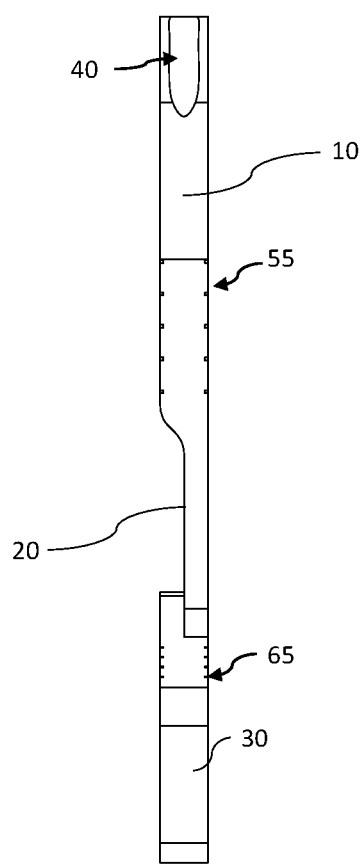
FIG. 6 is a right side view of the present invention.

In one embodiment, the middle section 20 is tapered to a thinner thickness than the top section 10 as shown in FIG. 6.

In its preferred embodiment the middle section 20 comprises a plurality of large middle marks 55, a plurality of small middle hashmarks 56, and a plurality of measuring slots 60. The plurality of large middle marks 55 is designed as a slight indentation into the surface of the middle section 20 along the front and rear side.

The plurality of large middle marks 55 has a horizontal shape with an accompanying number going from 15 to 35 increasing by 5 at each interval. Each of the plurality of large middle marks 55 can be separated by 5 mm. In between each of the plurality of large middle marks 55 is the plurality of small hashmarks 56. The plurality of small hashmarks 56 is small rectangular shapes, evenly spaced 1 mm apart. This design allows for an eye care professional to easily measure their patient with the present invention.

Positioned in the middle of the present invention is the plurality of measuring slots 60. The plurality of measuring slots 60 is vertical rectangular shaped cutouts that traverse through a body of the middle section 20. This design allows for the eye care provider to observe and measure specific areas of the patient while holding up the present invention.

Figure 5:
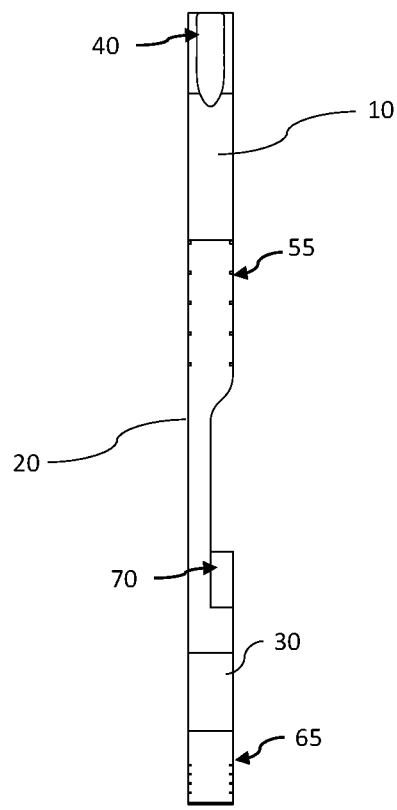
FIG. 5 is a left side view of the present invention.

The bottom section 30 is positioned below the middle section 20. The bottom section 30 is a rectangular shaped member that extends downwards at an angle as with a larger thickness (compared to the middle section 20) as seen FIG. 5.

In its preferred embodiment, the bottom section 30 comprises a plurality of bottom temple adjusters 70, a plurality of large bottom marks 65, a plurality of small bottom hashmarks 66, and a plurality of bottom measuring slots 80.

Figure 8:
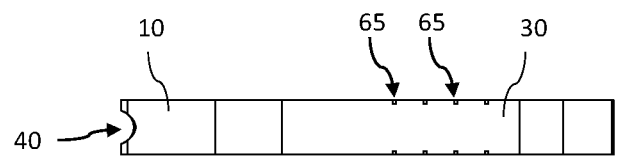
FIG. 8 is a bottom view of the present invention.

The plurality of bottom temple adjusters 70 is positioned along the top side of the bottom section 30 with a similar circular curved divot. In some embodiments, the plurality of bottom temple adjusters 70 can include the same shape as the temple adjusters 40 of the top section 10. This design allows an eye care professional to have another method of bending the temple of eyewear depending on his comfortability with holding the present invention. The bottom section 30, shown in FIG. 8, comprises a plurality of large bottom marks 65 positioned within the middle of the bottom section 30.

The plurality of large bottom marks 65 is rectangular recesses into the bottom section 30 with accompanying numbers from 10 to 25 in increments of 5. Each of the plurality of large bottom marks 65 is separated by 5 mm to ensure a consistent measurement tool. The plurality of small bottom hashmarks 66 is positioned between each of the plurality of large bottom marks 65. The plurality of small bottom hashmarks 66 is designed with a rectangular shaped recess with each one being positioned 1 mm from each other.

Figure 2:
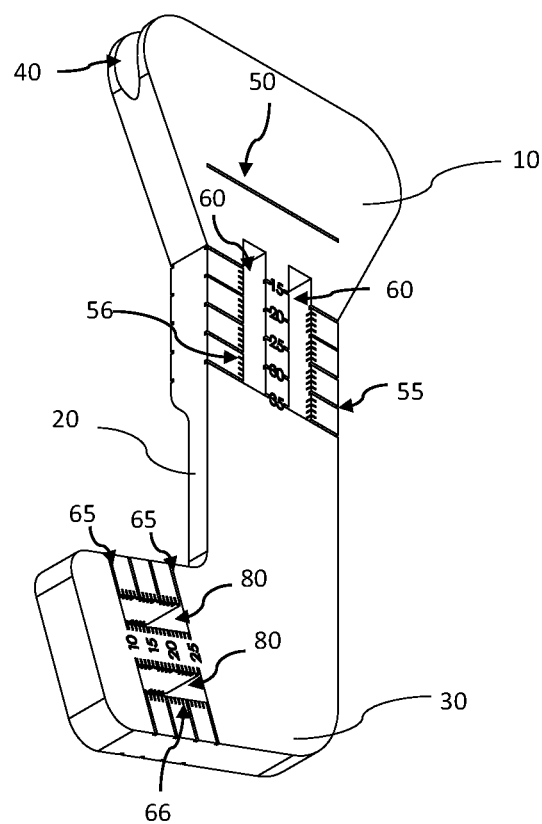
FIG. 2 is a bottom perspective view of the present invention.

As seen in FIG. 2, the plurality of bottom measuring slots 80 is rectangular empty sections that traverse through the body and surface of the bottom section 30. This design allows the eye care professional to observe the patient while making a measurement with the other components of the bottom section. With all the components working in tandem with each other it can be seen that, the present invention is specialty device that provides precise pupil height, and lined multifocal lens segment height measurement, curved and slotted guides for temple adjustments to allow eye care professionals to efficiently and accurately size and alter eyewear for patients.

It should be understood that the device of the present invention can be modified to be held at various positions and preferred angles for the comfortability of the eye care professional or the patient without departing from the spirit and scope of the invention.

Although the invention has been explained in relation to its preferred embodiment, it is to be understood that many other possible modifications and variations can be made without departing from the spirit and scope of the invention.

The following is claimed:

1. A device comprising:
a top section including
a plurality of temple adjusters placed on the top left side of the top section,
a plurality of temple adjusters placed on the top right side of the top section,
a viewing slot positioned in the a body of the top section, the viewing slot traverses through the body of the top section;
a middle section coupled to the top section, the middle section extends downward from one end of the top section, the middle section is tapered to a thinner thickness than a thickness of the top section, wherein the middle section includes:
a plurality of large middle marks, the plurality of large middle marks includes a horizontal shape with an accompanying number going from 10 to 35 increasing by 5 at each interval, each of the plurality of large middle marks is separated by 5 mm,
a plurality of small middle hashmarks positioned in between each of the plurality of large middle marks, and
a plurality of measuring slots placed in the middle section, the plurality of measuring slots traverse through a body of the middle section; and
a bottom section coupled to one end of the middle section, the bottom section extends downwards at an angle as with a larger thickness than a thickness of the middle section, wherein the bottom section includes:
a plurality of bottom temple adjusters positioned along the top side of the bottom section, a plurality of large bottom marks, the plurality of large bottom marks includes rectangular recesses into the bottom section with accompanying numbers from 10 to 25, a plurality of small bottom hashmarks, the plurality of small bottom hashmarks includes a rectangular shaped recess with each one being positioned 1 mm from each other, and a plurality of bottom measuring slots, the plurality of bottom measuring slots includes rectangular empty sections that traverse through a body of the bottom section.

2. The device as claimed in claim 1, wherein the top section is made of a plastic or metal.

3. The device as claimed in claim 1, wherein the top section includes a trapezoidal shape with a plurality of curved points.

4. The device as claimed in claim 1, wherein the first plurality of temple adjusters is a circular shaped curved divot that runs along the edge of the top section.

5. The device as claimed in claim 1, wherein the plurality of temple adjusters includes a curve of a mastoid bone.

6. The device as claimed in claim 1, wherein the viewing slot is a rectangular shaped horizontal slit.

7. A device comprising:
a top section having a trapezoidal shape including:
a plurality of temple adjusters placed on the top left side of the top section,
a plurality of temple adjusters placed on the top right side of the top section,
a viewing slot positioned in the a body of the top section, the viewing slot traverses through the body of the top section;
a middle section coupled to the top section, the middle section extends downward from one end of the top section, the middle section is tapered to a thinner thickness than a thickness of the top section, wherein the middle section includes:
a plurality of large middle marks that includes an indentation into the surface of the middle section along the front and rear side of the middle section,
a plurality of small middle hashmarks, positioned in between each of the plurality of large middle marks, and
a plurality of measuring slots placed in the middle section, the plurality of measuring slots traverse through a body of the middle section; and
a bottom section coupled to one end of the middle section, the bottom section extends downwards at an angle as with a larger thickness than a thickness of the middle section, wherein the bottom section includes:
a plurality of bottom temple adjusters positioned along the top side of the bottom section,
a plurality of large bottom marks,
a plurality of small bottom hashmarks, and
a plurality of bottom measuring slots.

8. The device as claimed in claim 7, wherein the top section is made of a plastic material.

9. The device as claimed in claim 7, wherein the first plurality of temple adjusters is a circular shaped curved divot that runs along the edge of the top section.

10. The device as claimed in claim 7, wherein the plurality of temple adjusters include a curve of a mastoid bone.

11. The device as claimed in claim 7, wherein the viewing slot is a rectangular shaped horizontal slit.

12. A device comprising:
a top section made of a plastic or metal material, having a trapezoidal shape, the top section includes:
a plurality of temple adjusters placed on the top left side of the top section,
a plurality of temple adjusters placed on the top right side of the top section,
a viewing slot positioned in the a body of the top section, the viewing slot traverses through the body of the top section;
a middle section coupled to the top section, the middle section extends downward from one end of the top section, the middle section is tapered to a thinner thickness than a thickness of the top section, wherein the middle section includes:
a plurality of large middle marks,
a plurality of small middle hashmarks, positioned in between each of the plurality of large middle marks and
a plurality of measuring slots placed in the middle section, the plurality of measuring slots traverse through a body of the middle section; and
a bottom section having a rectangular shaped member, coupled to one end of the middle section, the bottom section extends downwards at an angle as with a larger thickness than a thickness of the middle section, wherein the bottom section includes:
a plurality of bottom temple adjusters positioned along the top side of the bottom section,
a plurality of large bottom marks, the plurality of large bottom marks includes rectangular recesses into the bottom section with accompanying numbers from 10 to 25 in increments of 5, each of the plurality of large bottom marks is separated by 5 mm, and
a plurality of small bottom hashmarks, the plurality of small bottom hashmarks includes a rectangular shaped recess with each one being positioned 1 mm from each other and a plurality of bottom measuring slots.

13. The device as claimed in claim 12, wherein the top section is made of a plastic or metal material.

14. The device as claimed in claim 12, wherein the top section includes a plurality of curved points.

15. The device as claimed in claim 12, wherein the first plurality of temple adjusters is a circular shaped curved divot that runs along the edge of the top section.

16. The device as claimed in claim 12, wherein the plurality of temple adjusters includes a curve of a mastoid bone.

17. The device as claimed in claim 12, wherein the viewing slot is a rectangular shaped horizontal slit.

18. The device as claimed in claim 12, wherein the plurality of large middle marks includes a horizontal shape with an accompanying number going from 15 to 35 increasing by 5 at each interval, each of the plurality of large middle marks is separated by 5 mm.

19. The device as claimed in claim 12, wherein the plurality of small hashmarks includes small rectangular shapes.

20. The device as claimed in claim 12, wherein the plurality of small hashmarks is evenly spaced 1 mm apart.

* * * * *